Oct. 10, 1967

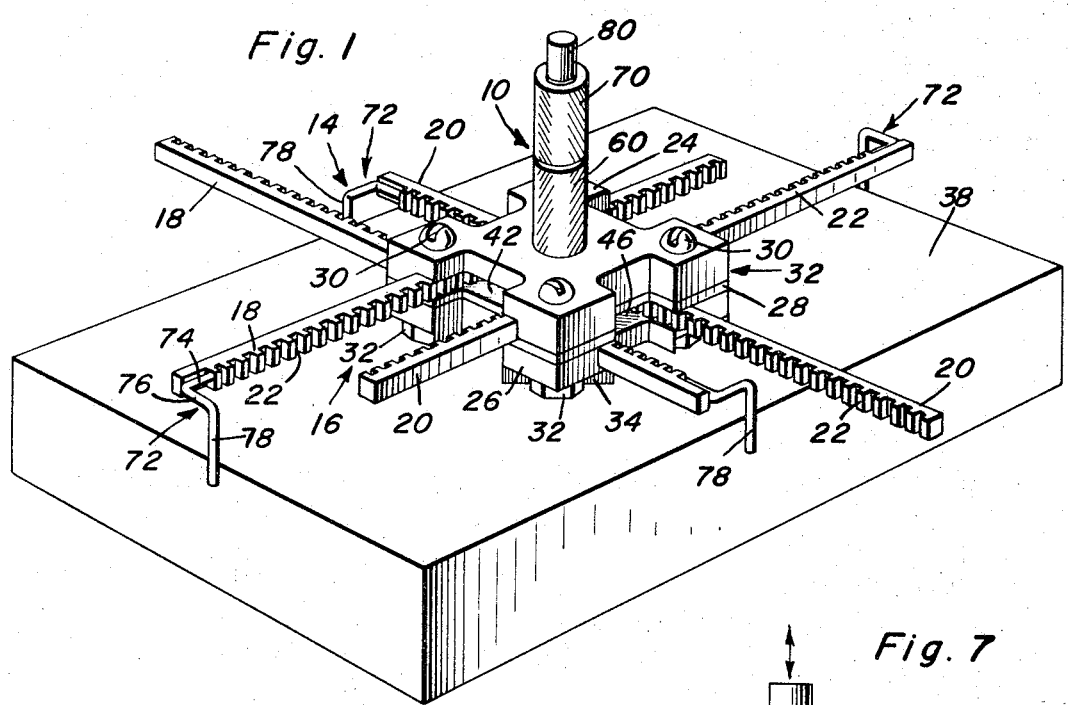
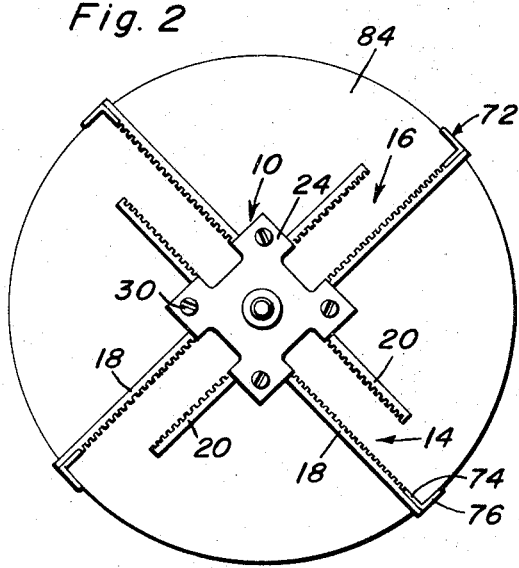
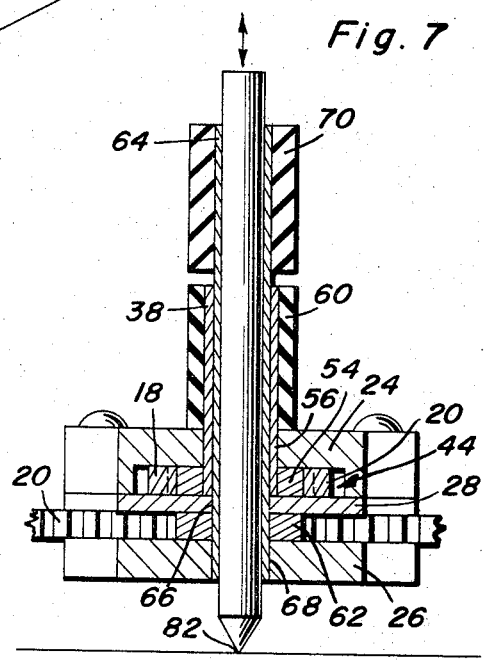

R. H. FEREBEE 3,345,755

MECHANICAL CENTERING DEVICE

Filed Nov. 12, 1965

Roy H. Ferebee
INVENTOR.

BY *Clarence A. O'Brien*
and *Harvey B. Jacobson*
Attorneys

United States Patent Office 3,345,755
Patented Oct. 10, 1967

3,345,755
MECHANICAL CENTERING DEVICE
Roy H. Ferebee, Rte. 3, Charlotte, Tenn. 37036
Filed Nov. 12, 1965, Ser. No. 507,363
10 Claims. (Cl. 33—191)

ABSTRACT OF THE DISCLOSURE

A hub having two stacked pairs of arms projecting laterally from the hub, each pair of arms is orientated at 90° to the other pair of arms and is individually controlled for a selective extension and retraction of the arms independent of the arms of the other pair. The independent movement of the individual pairs of arms is effected by means of two concentric independently rotatable shafts extending through the hub and individually mounting an arm-engaging member.

This invention relates generally to a centering device, and more particularly to an improved mechanical center locating device which may be used with either symmetrical or unsymmetrical objects, and includes means for either inscribing or viewing the center area which has been located.

Heretofore, devices of this general type have been used for accurately locating the centers of objects which are symmetrical about a center axis. These prior devices utilized two pairs of perpendicularly mounted cross arms which are controlled by one centrally located gear, and thus both pairs of arms are moved simultaneously. While various types of adjustable legs or other modifications have been utilized with such prior art devices for adding the capability of locating the centers of unsymmetrical objects, such modifications have proved unsatisfactory due to the necessitated complexity involved.

Accordingly, it is an object of the present invention to provide a center locating device which may be used for locating centers of either symmetrical or unsymmetrical objects with equal facility.

It is another object of the present invention to provide a center locating device which can be used for locating centers of either symmetrical or unsymmetrical objects without the necessity of altering, resetting or otherwise modifying the device.

It is a further object of the present invention to provide a center locating device which is of relatively simple and inexpensive construction, while at the same time is quite sturdy, the device allowing either visual inspection of the located central area or marking thereof.

It is a still further object of the present invention to provide a center locating device including two pairs of parallel mounted arms, the arms being laterally extensible from a central hub assembly and including means for moving each pair of arms independently of the other pair.

It is a final object of the present invention to provide a center locating device of the character described including means for maintaining a positioning tension on the center locating arms.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the centering device comprising the present invention illustrated in place on an unsymmetrical object, the device being located in central position thereon;

FIGURE 2 is a top plan view of the centering device comprising the present invention illustrated in place on a symmetrical object;

FIGURE 7 is an enlarged vertical sectional view taken substantially on the plane of the line 7—7 of FIGURE 3.

Figure 3:
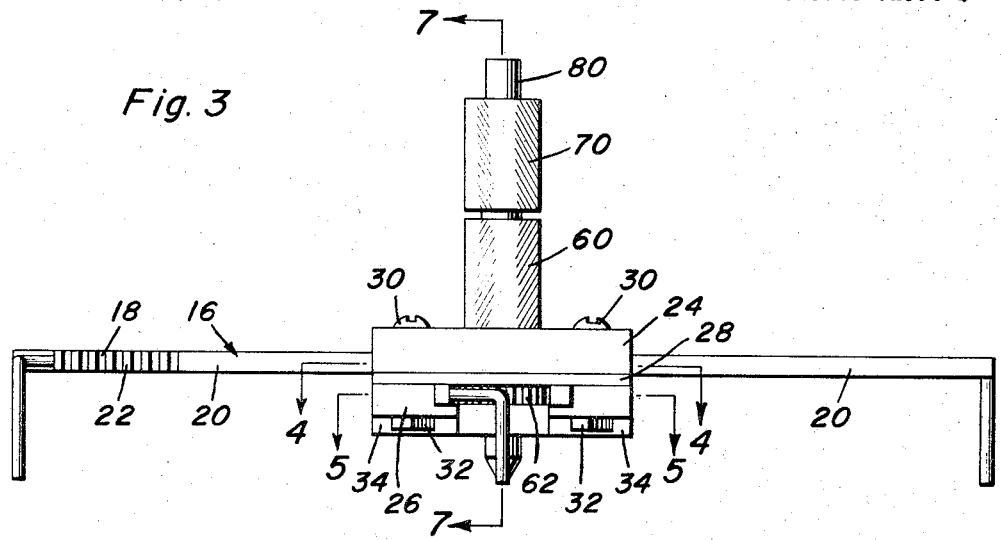
FIGURE 3 is a side elevational view of the centering device comprising the present invention.

Referring now more particularly to the drawings, reference numeral 10 generally denotes the mechanical centering device comprising the present invention. The centering device 10 includes a central hub assembly generally denoted by reference numeral 12 having two pairs of arms 14 and 16 mounted therein for longitudinal or lateral extension therefrom.

The pairs of arms 14 and 16 each include first and second parallel rack arms 18 and 20, each arm having notches or teeth 22 on the front edge thereof, the arms 18 and 20 of each pair 14 and 16 being parallel to one another and perpendicular to the other pair, and all the arms are mounted in a manner described more fully hereinafter for longitudinal movement through hub 12.

The central hub assembly 12 includes a top mounting plate 24, a bottom mounting plate 26 and a spacer plate 28 between the top and bottom mounting plates, the top and bottom mounting plates and the spacer plate being retained in assembled condition by the bolts 30. The bolts 30 have nuts 32 thereon, the nuts 32 being positioned in cutout portions 34 in the bottom mounting plate 26 whereby the bottom mounting plate 26 may be seated flat against an object such as the upper surface 38 of rectangular block 40 in order to locate the center point thereof.

Figure 4:
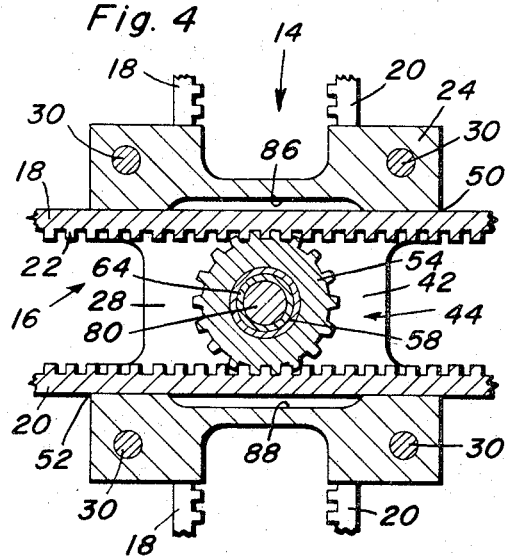
FIGURE 4 is an enlarged horizontal sectional view taken substantially on the plane of the line 4—4 of FIGURE 3.

The top mounting plate 24 has a centrally located recess 42 therein, the recess 42 opening downwardly and being closed by the spacer plate 28 in order to form a chamber 44 for mounting of the arm pair 16. Thus, referring to FIGURE 4 in particular, it will be observed that the arms 18 and 20 of pair 16 are located in the chamber 44. The bottom mounting plate 26 is substantially identical to the top mounting plate 24 and includes a central recess 46 therein, the recess 46 opening upwardly and being closed at the top by the spacer plate 28 in order to form a chamber 48 for the arm pair 14. Thus, by referring to FIGURE 5, it will be observed that the arms 18 and 20 of pair 14 are received in the chamber 48. Further, by referring to FIGURES 4 and 5, it will be observed that the plates 24 and 26 are substantially identical, each being square and mounted in 90 degree offset relationship whereby the pairs of arms 14 and 16 extend at right angles to each other. Further, the recesses 42 and 46 in the mounting plates 24 and 26 are open at the ends 50 and 52 whereby the pairs of arms 16 and 14 will extend through each recess and outwardly of the chambers 44 and 48.

A pinion gear 54 is mounted in the chamber 44 in top mounting plate 24 for engagement with the notches or teeth 22 on the arms 18 and 20. As will be best observed in FIGURE 7, the top mounting plate 24 has an aperture 56 therein opening into the chamber 44 and a hollow cylindrical member 58 is rotatably mounted in the opening 56. The gear 54 is mounted on the cylindrical member 58 for rotation therewith, and thus rotation of the cylindrical member 58 will rotate the gear 54 and hence move the arms 18 and 20 of pair 16 longitudinally through the chamber 44 and in opposite directions. A sleeve member 60 preferably of rubber or like material is press fit over the cylindrical member 58 in order to provide a gripping surface thereon for facilitating the rotation thereof.

Figure 5:
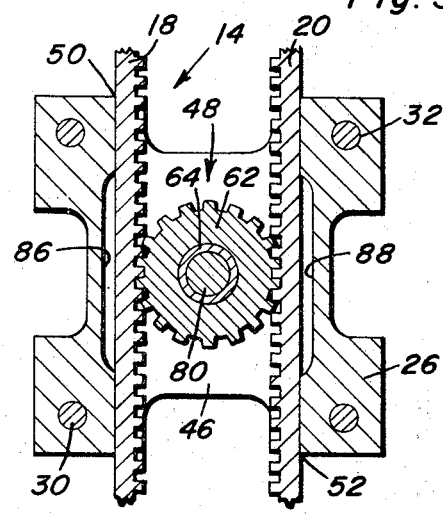
FIGURE 5 is an enlarged horizontal sectional view taken substantially on the plane of the line 5—5 of FIGURE 3.
Figure 6:
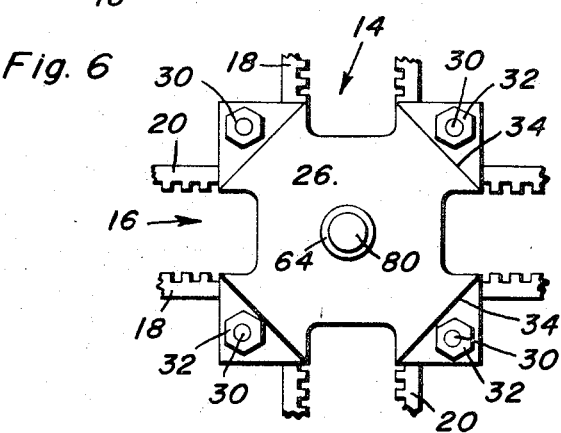
FIGURE 6 is a partial bottom plan view of the central hub assembly of the mechanical centering device comprising the present invention.

Referring now to FIGURE 5 in conjunction with FIGURE 7, it will be observed that a pinion gear 62 is rotatably mounted in the chamber 48 on a hollow cylindrical member 64 which extends through the opening 56 in top mounting plate 28, and through concentric openings 66 and 68 in the spacer plate 28 and bottom mounting plate 26, respectively. Of course, the openings 66 and 68 are of smaller diameter than the opening 56 inasmuch as the opening 56 must be large enough to receive the cylindrical member 58 which is of a greater outer diameter than the cylindrical member 64. Thus, by viewing FIGURE 7 it will be appreciated that the cylindrical member 64 is mounted within the cylindrical member 58 and extends both downwardly and upwardly therefrom, the cylindrical member 64 being rotatable within the cylindrical member 58 and the cylindrical member 58 being rotatable around the cylindrical member 64. A sleeve 70 similar to sleeve 60 is press fit on the cylindrical member 64 to facilitate the rotation thereof. The cylindrical member 64 extends downwardly through the opening 68 in bottom mounting plate 26 and terminates at the bottom surface thereof. Thus, by viewing FIGURE 7 in particular, it will be observed that the gears 54 and 62 are rotatably mounted in chambers 44 and 48, respectively, and may be separately rotated by rotating either of the cylindrical members 58 and 64. The cylindrical members 58 and 64 controls each gear 54 and 62 respectively, and each gear separately controls the movement of the arm pairs 14 and 16, respectively. Thus, by referring to FIGURE 1 in particular, it will be observed that the center of an unsymmetrical object such as the block 40 may be found through the separate control of the arm pairs 14 and 16. Each arm 18 and 20 of each pair 14 and 16 has a foot member 72 thereon, the foot members 72 each including a portion 74 attached to a rack arm, a portion 76 extending at right angles thereto, and a portion 78 which is downturned in order to provide a stop as illustrated in FIGURE 1, for example.

Thus, it will be apparent by viewing FIGURE 1 in particular that the center of unsymmetrical object 40 may be located by first turning the cylindrical member 58 until the stop portions 78 of arm pair 14 abut the parallel sides of the block at which time the longitudinal centerline of the block has been located, and then turning the cylindrical member 64 until the transverse centerline of the block is similarly located. It will be apparent that the exact center of the block 40 will be located at the intersection of the longitudinal and transverse centerlines, and this point may be observed by looking downwardly through the hollow cylindrical member 64, or, as illustrated in the drawings, a punch 80 comprising a cylindrical body and a sharpened end 82 may be utilized to inscribe the exact center of the block. The punch 80 is, of course, slidable vertically in the hollow cylindrical member 64 and thus when the center point has been located by positioning of the arm pairs 14 and 16, the punch may be slid downwardly through the cylindrical member 64 and tapped with a hammer or the like in order to accurately inscribe the center point of the block 40.

Referring now to FIGURE 2 in particular, it will be observed that the centering device 10 is illustrated in place on a generally circular object 84. This view is shown in order to indicate the versatility of the centering device 10, inasmuch as it may be used on a symmetrical object 84 as well as on the unsymmetrical object 40. When used on the object 84, the arm pairs 14 and 16 are still controlled separately by the cylindrical members 58 and 64, the cylindrical members being turned until the stop portion 78 of the foot members 72 abut the opposite sides of the object, at which time the center or axis of the object will be located, and may be either observed or punched.

Referring again to FIGURES 4 and 5, it will be seen that the chambers 44 and 48 include oppositely disposed recess portions 86 and 88 therein, the recess portions 86 and 88 being behind the respective pairs of rack arms 18 and 20 of each pair 14 and 16. It is anticipated that the gears 54 and 62 will be of such diameter that tension will be applied to the arms 18 and 20 by the gears 54 and 62 inasmuch as the arms 18 and 20 will be flexed outwardly slightly into the recesses 86 and 88 when in engagement with the gears. Thus, a positioning tension will be applied to the arms 18 and 20 of each pair. After the arms have been moved by the gears 54 and 62, the tension applied thereto by the gears biasing the arms slightly outwardly into the recesses 86 and 88 will provide means for retaining the arms in the set position, while at the same time the arms 18 and 20 will not bind against the wall of the chambers 44 and 48 inasmuch as the wall is cut back to form the recesses 86 and 88. It is further anticipated that the mounting plates 24 and 26 and the spacer plate 28 will be fabricated from suitable clear plastic material, and thus the entire area of the object over which the device 10 is seated will be visible while the centering operation is effected. This, of course, allows close control over the centering operation with concomitant accuracy in center locating.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a centering device including a central hub assembly, a first pair of parallel elongate arms slidably mounted in said central hub and extensible laterally therefrom, a second pair of parallel elongate arms slidably mounted in said central hub and extensible laterally therefrom, said second pair of arms being perpendicular to said first pair of arms, the improvement comprising, means in said central hub assembly for moving said first pair of arms, and means in said central hub assembly for moving said second pair of arms, said first and second named moving means being separately controllable whereby each pair of arms may be moved without the other pair being moved, said central hub assembly comprising upper and lower mounting plates, a spacer plate positioned between said upper and lower mounting plates, and means for releasably connecting said upper and lower mounting plates and said spacer plate in assembled condition, said upper and lower mounting plates each including a substantially centrally located recess portion and an aperture opening into said recess portion, said spacer plate including an aperture therein, the apertures in said upper and lower mounting plates and said spacer plate being substantially aligned when assembled by said connecting means, said first named moving means comprising first gear means in the recess portion in said upper mounting plate, said first gear means mounted on a first shaft means extending through the aperture in said upper mounting plate, said second named moving means comprising second gear means in the recess portion of said lower mounting plate, said second gear means mounted on a second shaft means extending through the apertures in said lower mounting plate, said spacer plate, and said upper mounting plate.

2. The combination of claim 1 wherein said first gear means is rotatably retained in the recess portion in said upper mounting plate by said spacer plate, and said second gear means is rotatably retained in the recess portion in said lower mounting plate by said spacer plate.

3. The combination of claim 1 wherein said first shaft means comprises a first elongate hollow cylindrical member, said second shaft means comprises a second elongate hollow cylindrical member, the outer diameter of said second cylindrical member being substantially equal to the inner diameter of said first cylindrical member, and said second cylindrical member being rotatably retained within said first cylindrical member and extending upwardly therefrom whereby said first and second gear means may be separately rotated by the separate rotation of said first and second cylindrical members, and means adapted to be slidably received within said second cylindrical member for marking the centerpoint of an object located by said centering device.

4. The combination of claim 1 wherein each of said gear means is orientated between the arms of the corresponding pair of arms and drivingly engaged with these arms at diametrically opposed points, said upper and lower plates each including a recess laterally outward of each arm in general alignment with the associated gear means for accommodating a slight lateral flexing of the arms by the gear means so as to develop a non-binding position-retaining tension on said arms.

5. The combination of claim 1 wherein said first and second gear means comprise, in each instance, a toothed gear, each of said arms having gear teeth therealong meshingly engaged with the teeth of the corresponding toothed gear.

6. In a centering device including a central hub assembly, a first pair of parallel elongate arms slidably mounted in said central hub and extensible laterally therefrom, a second pair of parallel elongate arms slidably mounted in said central hub and extensible laterally therefrom, said second pair of arms being perpendicular to said first pair of arms, the improvement comprising, means in said central hub assembly for moving said first pair of arms, and means in said central hub assembly for moving said second pair of arms, said first and second named moving means being separately controllable whereby each pair of arms may be moved without the other pair being moved, said arms of said first and second arm pairs each having gear teeth thereon, each said moving means comprising gear means, each said gear means rotatably mounted in said central hub and in contact with the gear teeth of both arms of one pair of arms, means for rotating each said gear means separately from the other whereby the movement of each said arm pairs may be separately controlled, said rotating means comprising first and second coaxially mounted tubular members, each of said tubular members being rotatably mounted in said control hub, each said gear means being fixedly mounted on one of said tubular members, and said tubular members being separately rotatable whereby said gear means can be separately rotated thereby separately moving each said arm pairs.

7. The combination of claim 6 wherein each gear means is mounted between the arms of the corresponding pair of arms, said central hub assembly including a recess laterally outward of each arm in general alignment with the corresponding gear means, each gear means effecting a slight lateral tensioning of the corresponding arms into the adjacent recesses whereby a non-binding position-maintaining tension is effected on each arm.

8. In a centering device including a central hub assembly, a first pair of parallel elongated arms slidably mounted in said central hub and extensible laterally therefrom, a second pair of parallel elongated arms slidably mounted in said central hub and extensible laterally therefrom, said second pair of arms being perpendicular to said first pair of arms and in overlying spaced relation thereto, first moving means in said central hub assembly for moving said first pair of arms, and second moving means in said central hub for moving said second pair of arms, said first and second moving means being separately controllable whereby each pair of arms may be moved without the other pair of arms being moved, said first moving means comprising a first arm engaging and driving member located within said central hub assembly and engaged with the arms of said first pair of arms independently of said second pair of arms, said first member being mounted on a first shaft means extending through said hub assembly and rotatably mounted therein, said second moving means comprising a second arm engaging and driving member engaged with the arms of the second pair of arms independently of the first pair of arms, said second member being mounted on a second shaft means extending through and rotatably mounted in said hub assembly, said first and second shaft means being independently rotatable for effecting the independent rotation of the first and second arm engaging and driving members and the corresponding independent movement of the first and second pairs of arms.

9. The combination of claim 8 wherein said first and second shaft means are concentrically mounted, said first and second driving members being orientated in spaced stacked relation to each other.

10. The combination of claim 9 wherein each of said arm engaging and driving members comprises a toothed gear, each of said arms including teeth therealong meshingly engaged with the corresponding toothed gear, said hub assembly having a recess defined laterally of each arm in alignment with the corresponding toothed gear for enabling a slight lateral flexing of the arms under the influence of the toothed gears whereby a tensioned positioning of the arms is effected in a non-binding manner.

References Cited
UNITED STATES PATENTS

| | | | |
|---|---|---|---|
| 1,048,944 | 12/1912 | Cook | 279—113 |
| 1,713,803 | 5/1929 | Whiton | 279—113 |
| 2,333,134 | 11/1943 | Whitlock | 33—189 |
| 2,481,246 | 9/1949 | Schlatter | 33—189 |
| 3,025,609 | 3/1962 | Hendrix | 33—191 |

LEONARD FORMAN, *Primary Examiner.*

WILLIAM D. MARTIN, JR., *Examiner.*